G. P. RETTIG.
FARM TRACTOR.
APPLICATION FILED DEC. 19, 1914.
1,160,320.
Patented Nov. 16, 1915.
2 SHEETS—SHEET 1.
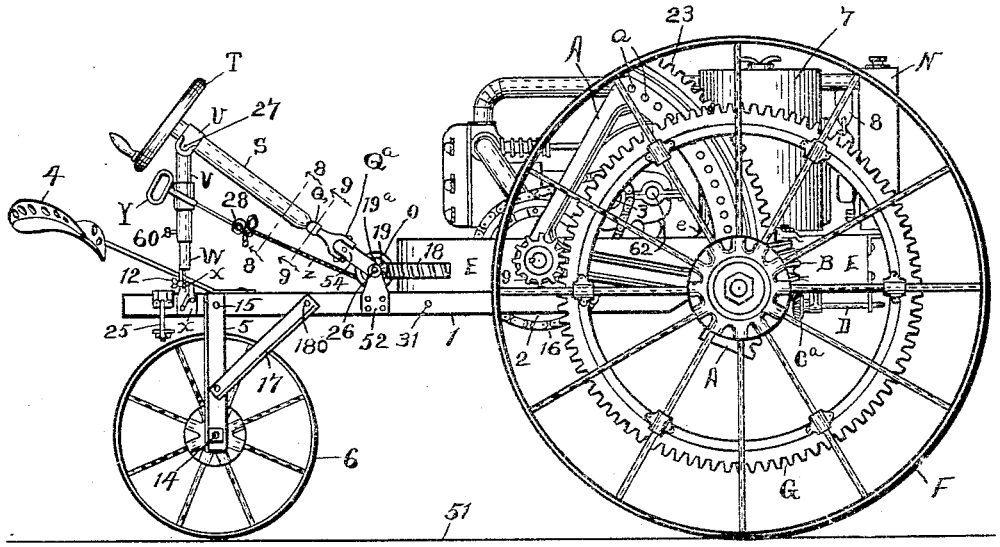
Fig. 1.
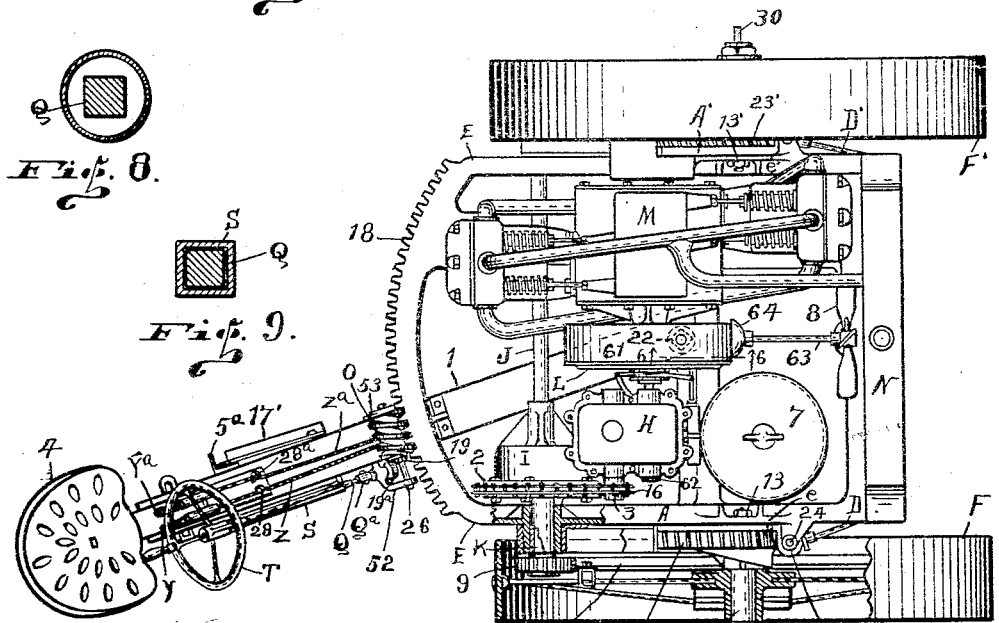
Fig. 8.
Fig. 9.
Fig. 2.
Witnesses:
Adelaide Kearns
R. E. Randle
Inventor:
George P. Rettig
By Robert W. Candle
Attorney

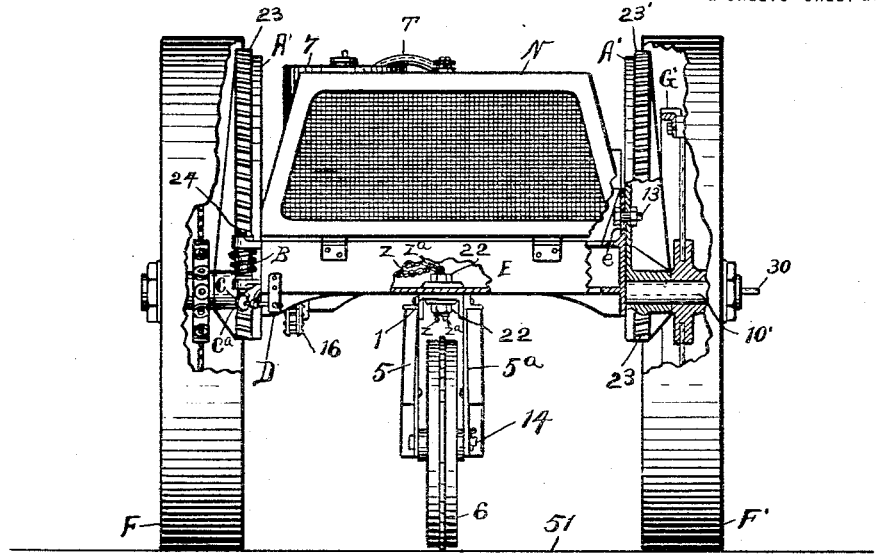
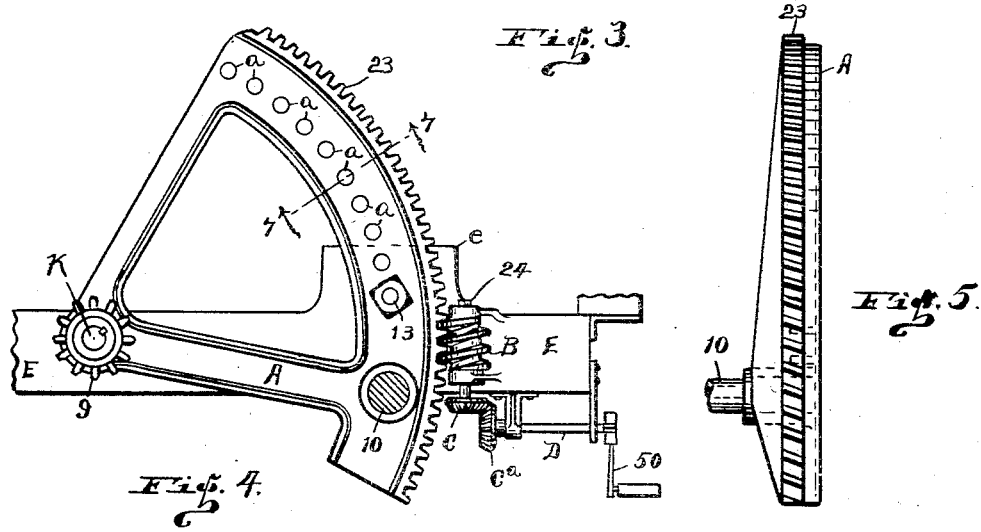

UNITED STATES PATENT OFFICE.

GEORGE P. RETTIG, OF RICHMOND, INDIANA.

FARM-TRACTOR.

1,160,320.

Specification of Letters Patent. Patented Nov. 16, 1915.

Application filed December 19, 1914. Serial No. 878,033.

*To all whom it may concern:*

Be it known that I, GEORGE P. RETTIG, a citizen of the United States, residing at Richmond, in the county of Wayne and in the State of Indiana, have invented certain new and useful Improvements in Farm-Tractors, of which the following is a full, clear, and exact description of the essential features thereof.

The object of my present invention is to provide a farm tractor which may be employed as a prime mover for various kinds of tools, implements, or machines, such as are commonly employed in farm work, that is, producing a tractor which may be adjusted to operate or draw such instruments, it being adapted to operate at various elevations; and with means for adjusting the steering and the control whereby the tractor may be operated by the attendant who may be located on the tool drawn by the tractor, or by the operator located on the tractor.

The elevation of the tractor, the extension of the control, and the extension and the location of the steering wheel, being adjustable in order to meet the requirements of the implement which it is to draw, thereby making it possible for the tractor and the implement to be managed by a single individual, as in the case of animal drawn implements.

Other minor objects and particular advantages of my invention will suggest themselves in the course of the following description, and that which is new will be set forth in detail in the specification, and that which is new will be correlated in the claims.

In order to provide a tractor containing the features above mentioned I have produced the construction and the arrangement of parts as shown in the accompanying drawings, in which—

Figure 1 is a right-hand side elevation of my tractor, as it would appear alone, that is without an implement attached thereto. Fig. 2 is a top plan view of the tractor shown in Fig. 1, except that it is shown as in the act of turning to the right. Fig. 3 is a front elevation of the tractor, certain parts being broken away in order to show parts which would be hidden thereby. Fig. 4 is a detail view showing one of the devices for raising and lowering the main portion of the tractor. Fig. 5 is a front edge elevation of one of the segmental raising and lowering members. Fig. 6 is a detail section of the king-bolt arrangement, the same being taken longitudinally of the draw-bar. Fig. 7 is a detail cross section of one of the raising and lowering members, as taken on line 7—7 of Fig. 4. Fig. 8 is a cross section of the steering column, as taken on the line 8—8 of Fig. 1. And Fig. 9 is a detail cross section of the steering mechanism, as taken on the line 9—9 of Fig. 1.

Similar indices denote like parts throughout the several views of the two sheets of drawings.

In order that the construction, the arrangement, and the various features of my invention may be fully understood I will now take up a detailed description thereof, in which I will set forth the various parts as fully and as comprehensively as I may.

In the following description it will not be necessary to enter into a detailed description of various devices which are common to tractors, and other motor vehicles, but will only describe in detail such parts as are new, referring merely to the parts which are old in a general way, and to their arrangements with relation to each other, which arrangements may be variously changed.

It will be noticed that certain parts are in duplicate, that is there are two parts of the same construction located on opposite sides of the tractor, in such cases I will describe the part on one side in minutia, referring to the same by indices, and will designate the parts identical therewith on the opposite side of the tractor by like indices with the exponent.

Referring now to the drawings in detail: Letter E denotes the main frame, having minor cross members which support the motor M, the transmission H, the radiator N, the fuel tank 7, the fan 8, the differential I, and various other parts. The rear edge of the frame E terminates in the segmental gear 18, which is integral therewith, all parts of the frame being preferably formed in one integral construction.

Numeral 1 denotes the draw-bar, whose forward end is attached to the underside of the center of the frame by means of the single king-bolt 22, from which latter the cross-bar extends a considerable distance to the rear of the frame, and its rear end carries the adjustable clamp 25, which is for the purpose hereinafter stated.

Extending down from the sides of the rear portion of the drawbar 1 and pivoted thereto by the bolt 15, are the hangers 5 and 5ª, whose lower ends carry the axle 14 on which is mounted the follow wheel 6. Each of the said hangers is retained in place by a brace 17, as shown in Fig. 1, the upper forward end of the said braces being secured to the draw-bar by the bolt 18°.

Extending across through the rear portion of the frame E is the two-part driving shaft J—K, the two portions thereof being connected by the differential I. Carried by the said shaft J—K is the large sprocket-wheel 2. Extending out from the transmission H is the drive-shaft 3, on which is secured a small sprocket-wheel which is in a line with the sprocket-wheel 2, and connecting said small and large sprocket wheels is the sprocket-chain 16. Secured on the outer ends of the shaft J—K are pinions, as the pinion 9 shown in Figs. 1 and 2. Rotatably mounted on the outer end portions of the shaft J—K, between the said pinions and the sides of the frame, are the triangular lifting members A, each having a segmental portion on its periphery provided with angular gears 23, the said gears being formed in a curve concentric with the bearing of the members A upon the shaft J—K, whereby said gears may swing up and down concentric with shaft J—K, for the purpose hereinafter made clear.

Rigidly secured to and extending out from the lower forward portion of each of the members A is an axle 10, on which axles are revolubly mounted the respective traction wheels F.

Extending around concentric with the hubs and the rims of the wheels F, and secured to the spokes thereof, are the gear rings G, each meshing with its respective pinion 9, as shown in Fig. 1.

Formed through the segmental part of the members A are a plurality of holes a, which are arranged in a line parallel with the gears 23 and therefore concentric with the axle J—K.

Flanges e extend up from each of the sides of the frame E, adjoining the main or segmental portions of the members A, through each of which is a single hole for the bolt 13, which bolts are also adapted to extend through one of the holes a, to hold the members A at any desired height, after having been adjusted.

The members A are adapted to be turned concentric with the shaft J—K, on which they are mounted, by means of the vertical worms B, which worms are secured on their shaft 24, the latter being mounted in suitable brackets carried on the outer face of the sides of the frame E, substantially as shown in Fig. 4. The said worm B meshes with its gear 23, and on the lower end of the shaft 24 is the bevel-gear C which meshes with the bevel-gear Cª, the latter being secured on the rear end of the shaft D, and the shaft D is carried by suitable hangers depending from the frame E.

A removable crank 50 is adapted to be attached to the forward end of the shaft D, by the turning of which the worm B may be revolved to raise and lower the forward portions of the members A, and therefore the axles 10, or as in practice, raising and lowering the frame E, and all of the parts carried thereby, while the traction wheels remain on the ground 51.

It is, of course, to be understood that the means just described for raising and lowering the frame is in duplicate, that is one of such mechanisms is located on each side of the tractor, except the crank 50 which may be changed from one to the other of the shafts D, therefore by turning the shafts D the tractor may be raised and lowered in order to adjust it to the height of the implement to which the tractor is to be attached, in order that there will be the same clearance beneath the tractor that there is beneath the implement to be operated thereby.

When the tractor is to be operated alone, or without rigid connection with the implement, then it is necessary to employ the follow wheel 6, in order to support the rear end of the drawbar 1, but when attached to an implement then the wheel 6 is removed, by withdrawing the axle 14 and folding the hangers 5 and the braces 17 up parallel with the drawbar, where they may be secured by inserting pin 18° through the hole 31 in the drawbar. The wheel 6 may, for convenience, be secured on the stem 30 which extends out from the hub of the wheel F, where it will be carried.

Numeral 4 denotes the driver's seat which is carried by the rear portion of the drawbar, and when desired it may be removed if it should interfere with the movements of the driver when he is located on the implement in the rear thereof.

The implement to be drawn should be provided with a stub tongue, which may be secured to the rear end of the draw-bar by the clamp 25 shown in Fig. 1, or otherwise if desired.

It will be seen that the draw-bar may travel forward parallel with the implement being drawn yet the tractor wheels together with the frame and the parts carried thereby may be turned to the right or the left upon the king-bolt 22 as a pivot; the means for accomplishing this will now be described: The worm-gear O is mounted horizontally across the top of the draw-bar, being secured on the shaft 26, the latter being mounted in suitable brackets 52 and 53 which extend up from the sides of the draw-bar, as in Figs. 1 and 2, the worm-gear O being in mesh with the segmental gear 18. Also mounted on the shaft 26 is the miter-gear 19, which meshes with the miter-gear 19ª, the latter being secured on the lower end of the stem 54 whose upper end forms a part of the universal joint Qª, as shown in Fig. 1. Extending upward and rearward from the universal joint Qª is the shaft Q, which is square in cross section, and it telescopes into the steering column S, the interior of the lower end of which is formed square in cross section to fit around the shaft Q, as in Fig. 9.

Secured on the upper end of the steering column S is the steering wheel T, which is adapted to be rotated. The upper portion of the column S operates in a collar U which has a downwardly extending pair of ears through which is disposed the pin 27 on which is pivoted the upper end of the hollow standard V. Telescoping into the standard V is the rod W, the lower end of which is removably connected to the bracket X, the latter being secured to the draw-bar 1. The bracket X and the lower end of the rod W are adjustably connected by the thumb-nut 12. The standard V and the rod W may be secured together by the set-screw 60.

From the above it will be seen that the position of the steering wheel may be universally adjusted, up and down, to the right or left, and forward and backward, and rotatably secured at any desired angle, in order to accommodate the position of the operator. It will also be seen that by turning the wheel T the worm O, operating on the gear 18, will turn the main frame and the parts carried thereby to the right or the left while the draw-bar remains relatively stationary.

Slidably mounted in suitable hangers on the sides of the standard V are the controller handles Y and Yª which are adapted to slide forward and backward. Secured in the eyes 28—28ª, formed on the forward ends of said handles are the cables Z and Zª, respectively. The said cables extend forward under the worm O, down through an aperture in the bar 1, then forward through the channel of the bar 1, then up through the hollow of the king-bolt 22, and they are then connected to the gear levers of the transmission H, and they are adapted to shift the gears to neutral, reverse, or to one of the forward speeds, as in any well known manner.

The fly-wheel 61 is mounted on the shaf 62, the latter being driven by the shaft 5 through the gears located inside the transmission H. The fan 8 is adapted to be rotated, it being secured on the shaft 63. On the rear end of shaft 63 is the disk 64 whose face is adapted to contact with the periphery of the fly-wheel 61, and it is located laterally to one side of the center thereof, as in Fig. 2, whereby the rotation of the fly-wheel will revolve the fan 8 at right-angles thereto.

From the above it will be seen that I provide a very flexible and easily managed tractor, adapted to be used alone for various purposes. However when it is to be attached to an implement, as for instance a plow, the wheel 6 may be removed, the stub-tongue of the implement is then secured to the draw-bar 1 by means of the clamp 25, the tongue and the draw-bar being located in alinement with each other. The standard V may then be detached from the draw-bar and moved back and in like manner secured to some convenient part of the implement, the cables z and zª should be lengthened in the same proportion as the steering column. It will be noticed that the universal joint in the steering column, the telescoping feature of the steering column, the adjustable standard V, and the ability to lengthen and shorten the cables z and zª permits great latitude for the arrangement for the location of the operator upon the implement to be drawn.

Then in order to adjust the height of the tractor to that of the implement one has only to remove the bolts 13, and then turn the shafts D until the tractor is raised or lowered to the height required, after which the bolts 13 are replaced through their apertures in the members A, which of course will retain the tractor chassis rigidly at the desired elevation to which it is adjusted.

I desire that it be understood that various changes may be made in the several details of construction and in the particular arrangements of the several parts, from that herein shown and described, without departing from the spirit of my invention and without sacrificing any of the advantages thereof.

Having now fully shown and described my invention, what I claim and desire to secure by Letters Patent of the United States, is—

1. In a farm tractor comprising a main frame, a motor carried on the main frame, a shaft carried by the main frame and adapted to be rotated by said motor, pinions secured on the outer end portions of the main shaft, triangular members pivoted eccentrically on each end portion of said shaft, a gear formed in the forward edge of the triangular members, the said gear being concentric with said shaft, an axle extending out from the said triangular members, a traction wheel mounted on each of said axles, a round gear carried by each of said traction wheels concentric with the respective axles thereof and each meshing with its respective pinion above mentioned, a worm gear meshing with each of said gears on the forward edges of the triangular members, means for revolving the said worm-gears, and means for rigidly holding the forward ends of the triangular members after they have been adjusted by said worm-gears.

2. A farm tractor comprising a main frame, a pair of ground wheels for supporting said frame, a shaft extending across the frame, means carried by the frame for revolving said shaft, means for revolving the ground wheels by the operation of said shaft, a draw-bar pivoted at its front near the center of said frame, means for connecting an implement to the rear end of the draw-bar, means carried by the draw-bar for turning the frame to the right or the left with reference to the draw-bar, means carried by the draw-bar for controlling said means for revolving said shaft, means for extending the said means for turning the frame and means for controlling the direction of travel of the tractor by a person located in the rear thereof, and means for raising and lowering the said frame with relation to the ground, all substantially as shown and described.

3. A farm tractor comprising a main frame, a pair of ground wheels for supporting the frame, means for raising and lowering the frame while the ground wheels remain relatively stationary, means for rigidly retaining the frame at the elevation to which it has been adjusted, a segmental rack formed on the rear edge of the main frame, a draw-bar extending rearward from underneath the center of the frame, a king-bolt connecting the forward end of the draw-bar to the frame, a removable follow wheel for supporting the rear end of the draw-bar, means for connecting an implement to be drawn to the rear end of the draw-bar, a steering wheel, a steering column extending forward and downward from the steering wheel, a worm-gear revolubly mounted horizontally across the draw-bar and engaging with said rack on the rear edge of the frame, means for connecting the steering column to said worm-gear whereby the worm-gear will be rotated by turning the steering wheel, means for lengthening and shortening the steering column, and a gear shifting control having means whereby it may be extended forward and backward, and means for operatively adjusting the steering wheel at any desired angle both vertically and horizontally, all substantially as shown and described.

4. A farm tractor comprising a main frame having mounted thereon the various devices of a motor vehicle, the main lifting members mounted on the end portion of the driving shaft and at the sides of said frame, an axle carried by each lifting member, means for turning the main lifting members to raise and lower said axles, a ground wheel mounted on each of said axles, a draw-bar pivoted at its front end to the central portion of and underneath the main frame, a removable follow wheel for supporting the rear end of the draw-bar, a rack formed in the rear edge of the main frame, a worm-gear mounted horizontally across the draw-bar and in engagement with said rack of the frame, a steering wheel adapted to revolve said worm-gear, a telescoping steering column to which the steering wheel is secured, means for lengthening and shortening the steering column, means for adjusting the height and the horizontal position of the steering wheel at any point throughout a complete cycle of adjustments, a gear shifting mechanism, and means for adjusting the length of the gear shifting mechanism forward and backward, all substantially as shown and described.

In testimony whereof I have hereunto subscribed my name to this specification in the presence of two subscribing witnesses.

GEORGE P. RETTIG.

Witnesses:
 ROBT. W. RANDLE,
 R. E. RANDLE.